United States Patent [19]

Mathurin

[11] 3,768,815

[45] Oct. 30, 1973

[54] APPARATUS FOR CLAMPING AND CENTERING A FLEXIBLE MAGNETIC DISK

[75] Inventor: Edward Landais Mathurin, Los Gatos, Calif.

[73] Assignee: International Business Machines Corporation, Armonk, N.Y.

[22] Filed: June 21, 1972

[21] Appl. No.: 265,029

[52] U.S. Cl. .................................. 274/40, 346/137

[51] Int. Cl. .................................. A63d 7/00

[58] Field of Search .................................. 346/137; 179/100.2 A; 274/4 H, 40

[56] References Cited

UNITED STATES PATENTS

| | | | |
|---|---|---|---|
| 3,678,481 | 7/1972 | Dalziel | 340/174.1 C |
| 1,119,064 | 12/1914 | Capps | 274/40 |
| 2,042,171 | 5/1936 | Durand et al. | 274/40 |
| 3,509,992 | 5/1970 | David et al. | 346/137 |
| 3,570,661 | 3/1971 | Kersh | 346/137 |
| 2,113,141 | 4/1938 | Huenlich et al. | 274/40 |

*Primary Examiner*—Vincent P. Canney
*Attorney*—Robert W. Keller et al.

[57] ABSTRACT

An apparatus for clamping and centering a flexible magnetic disk in a disk drive is disclosed. The apparatus comprises a hub including an inner wall defining a recess therein and a face portion for supporting the disk, expandable means for expanding against the inner wall of the hub before clamping the disk to the face portion of the hub, and means for wedging the expandable means into its expanded position.

10 Claims, 3 Drawing Figures

APPARATUS FOR CLAMPING AND CENTERING A FLEXIBLE MAGNETIC DISK

BACKGROUND OF THE INVENTION

1. Field of the Invention

This invention relates to an improved apparatus for clamping and centering a flexible magnetic disk in a disk drive. More particularly, the apparatus includes expandable means for expanding against an inner wall of the hub on a disk drive and wedging means for forcing the expandable means into its expanded position.

2. Description of Prior Art

The use of low-cost flexible removable magnetic storage disks for storing relatively small amounts of information has brought about an expanding market for low cost miniature direct access storage devices for reading and/or writing the information on the flexible disks. An example of such a machine is the IBM 23FD disk drive. This drive has been employed as a microcode back-up, diagnostic aid, error logger and for initially loading a control program for computers and storage control systems. The flexible recording media that has been used in these low cost disk files is similar to that described in U.S. Pat. No. 3,668,658, Magnetic Record Disk Cover, by Ralph Flores et al. As described therein the magnetic disk is rotatably driven while enclosed in a cartridge, which protects the recording surface and decreases contamination.

One typical disk clamping apparatus used on a disk drive for clamping flexible magnetic disks is illustrated in U.S. Pat. No. 3,678,481, entitled Data Storage Apparatus Employing a Single Magnetic Disk and assigned in common with this application. The apparatus comprises a rigid disk positioner having a flanged head and a truncated cone-shaped lead surface. Upon actuation of the positioner its lead surface passes through the central opening of the disk, and into a recess in the associated rotatable drive hub of the disk drive. Further movement stretches the disk opening, slides the disk toward the flanged head of the positioner and thereafter clamps the disk to the front surface of the hub. In this type of apparatus, a slight annular spacing occurs between the outer surfaces of the positioner and the wall defining the hub recess, which spacing is undesirable since it causes misregistration of the disk upon the hub and a corresponding eccentricity in describing the tracks of the disk upon rotation. An error in concentricity of the disk with respect to the hub could result in the loss of the magnetically stored information which problem is compounded since the disks are interchangeable on different machines. This problem increases in severity as the aerial recording density on small flexible magnetic disks increases. For proper operation there should be no tolerance buildup between the disk clamping apparatus and the hub. To overcome the above-noted defects a novel apparatus for clamping and centering the flexible magnetic disk has been devised.

SUMMARY OF THE INVENTION

It is an object of this invention to provide in a disk drive, an apparatus for clamping and centering a flexible magnetic disk which ocmprises a hub including an inner wall defining a recess therein and a face portion for supporting the associated flexible disk, and expandable means for wedging the expandable means into its expanded position, whereby the expanded expandable means locates the disk against the inner wall of the hub, thus centering the disk on the hub, and clamps the disk to the face portion of the hub.

In accordance with the preceding object, it is still another object of the invention to further provide a shaft and an actuatable spring means, the expandable means and the wedging being disposed on the shaft with the spring means forcing the wedging means against the expandable means.

It is still another object in connection with the foregoing objects to provide that the expandable means be a flexible collet comprising a plurality of segments and including a lip portion for clamping the associated disk to the face portion of the hub, that the inner walls of the hub have a circular periphery and that the disk include a central opening that is of smaller diameter than the internal diameter of the inner walls, whereby the collet stretches the disk while clamping and centering the disk on the hub.

In accordance with the foregoing objects, it is yet another object that the disk drive further include a moveable cover portion, with the shaft being associated with the cover such that closing the cover portion moves the collet into the recess in the hub and forces the spring means against the wedging means, the wedging means thereupon radially expanding the collet, thus centering and clamping the disk to the hub.

Further features of the invention pertain to the particular arrangement of the parts of the clamping and centering apparatus whereby the above-outlined and additional operating features thereof are attained.

The invention, both as to its organization and method of operation, together with further objects and advantages thereof will be best understood with reference to the following specification taken in connection with the accompanying drawings.

DESCRIPTION OF THE PREFERRED EMBODIMENT

Figures 1, 3:
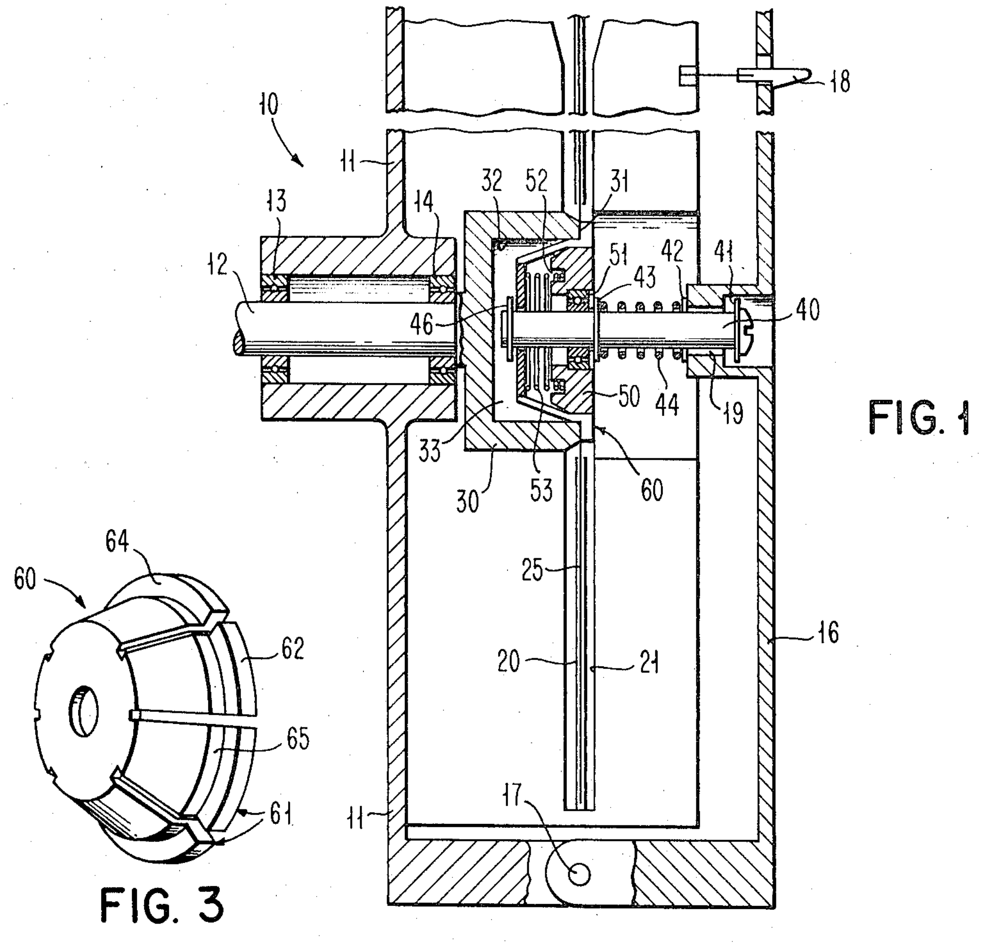
FIG. 1 is a side elevational view of the preferred embodiment of the clamping and centering apparatus with a portion being shown in cross section and yet another portion being broken away for further clarification of the invention.
FIG. 3 is a perspective view of the collet comprising the centering and clamping means of the invention.

Referring now to the drawings and, more particularly, to FIG. 1 thereof there is shown a portion of a disk drive 10 which embodies the apparatus for centering and clamping a flexible magnetic disk 25 enclosed within cartridge 20.

Disk drive 10 includes a frame with a base plate 11 having a drive shaft 12 extending perpendicularly therethrough, the rotatable shaft being mounted on bearings 13 and 14. At the distal end of drive shaft 12 is an annular hub 30. The hub 30 includes a flat face portion 31 for receiving and supporting the disk and an annular inner wall 32 defining a cylindrical recess 33 in the hub. The inner wall 32 is machined so as to accurately describe a circular locating surface which surface is used to accurately locate the flexible disk to the hub as will be more fully described hereafter.

The magnetic disk cartridge 20 having flexible disk 25 located therein is more fully described in U.S. Pat. No. 3,668,658, entitled Magnetic Record Disk Cover, and invented by Ralph Flores et al and does not constitute any portion of this claimed invention. The cartridge has a central opening of a larger diameter than the diameter of the central opening of the disk so as not to interfere with the clamping or rotation of the disk and a radially extending aperture exposing a portion of the record surface of the disk for receiving an associated magnetic head (not shown). The disk cartridge is removably interchangeable upon any of the described disk files, is mailable and may be thrown away if the disk contains a prerecorded program which becomes outdated.

The disk cartridge is shown to be mounted in a vertical position in guides 21, which are perpendicular to drive shaft 12. It should be remembered that if the drive is vertical the cartridge will be positioned horizontally and it is intended that the invention be not limited with respect to the orientation of the drive mechanism. A hinged cover 16 which is pivotal about an axis 17 is attached to the frame and secured thereto through latch 18. A shaft 40 for carrying the disk clamping apparatus is disposed through a recessed opening 19 in the cover 16. Coaxially disposed around and slidably carried by the shaft 40 are wedging means 50, expandable means 60 and a clamp spring 44. Retaining clip 43, fixedly positioned against wedging means 50 and retaining washer 41 maintain the clamp spring 44 in a preloaded position. Similarly, fixed retaining clips 43 and 46 maintain the release spring 53 positioned between the collet and the wedging means.

The expandable means 60, shown in FIG. 3, is unitary in construction and comprises a flexible collet having a plurality of segments 61 separated by slots. The collet 60 includes an outwardly protruding lip 62 defining a disk clamping surface 64 and a locating portion 65 for mating with the locating surface of the inner annular wall 32 of hub 30.

The rigid wedging means 50 has a truncated conical shape and includes a bearing assembly 51 therein to allow the wedging means and the collet to rotate about the shaft 40. The wedging means 50 has an annular recess 52 disposed proximate the inner surface of collet 60 for receiving a release spring 53. The wedging means 50 and collet 60 are freely rotatable on shaft 40 by means of bearing 51, whereas the shaft 40 is not rotatable.

Figure 2:
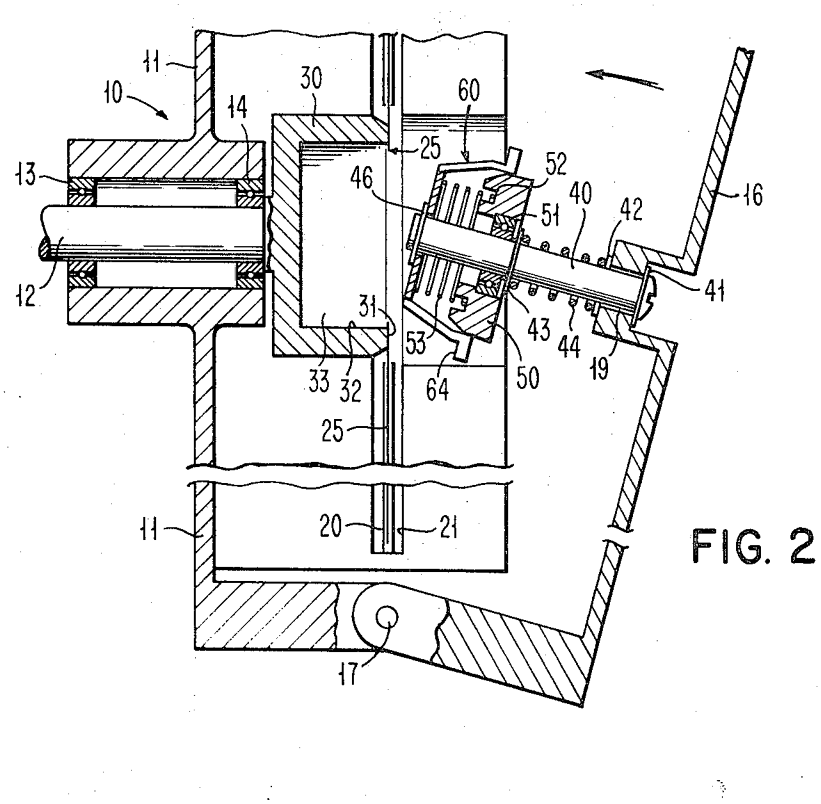
FIG. 2 is a side elevational view of the invention, with the cover pivoted open to show the unactuated position of the centering apparatus.

When the cover 16 is open, as shown in FIG. 2, the shaft retaining washer 41 abuts the outer surface of the recessed opening 19 of the cover due to the release of the clamping pressure from spring 44 and the retaining clip 46 abuts the collet 60 due to the expansion of release spring 53. As the cover is closed, the tapered conical surface of the collet 60 is urged through the central opening in the disk until the disk is located on portion 65 of the collet adjacent the lip 62. As the collet protrudes further into the recess 33 of the hub 30 the release spring 53 is compressed thus assuring that the collet is seated on the hub with the inner surface of the disk 25 firmly between the clamping surface 64 of the lip portion of the collet and the face portion of the hub 31. Further closing of the cover compresses the clamp spring 44 to force the wedging means 50 against the collet, thus radially outwardly expanding the collet until collet locating portion 65 firmly mates with the machined circular locating surface 32 of the hub 30. Since the central opening of the disk is of a smaller diameter than the internal diameter of the inner walls 32 of the hub the expanded collet stretches the disk while in conformity with those walls. Consequently the disk is concentrically clamped to the drive hub.

In this manner the disk 25 may be rotatably driven within the sealed cartridge 20, which is restrained from rotating with the disk by virtue of the guides 21. Moreover, the collet 60 and the wedging means 50 follow a corresponding rotation about shaft 40.

It should be noted that because of a clearance between the outer diameter of shaft 40 and the periphery of cover opening 19 the shaft is not constrained to a fixed axis but is radially displaceable within the cover. Accordingly, should there be a misalignment of the axes of the shaft 40 and the hub 30, the clamping apparatus will be centered on the hub. This feature prevents tolerance buildup between the frame and the hub.

On opening the cover, expansion of the release spring allows the collet to return to its smaller diameter and additionally releases the disk with minimum drag.

It has been found that collet expansions of only a few mils will not destroy the resilient properties of the stretched magnetic disk and yet assure accurate contact between the hub and the collet. Acetal resins have proven to be operative collet materials. Furthermore, a cone release spring with a one quarter pound force and a clamp spring with a nine pound force work satisfactorily in this apparatus.

Although not shown, in an alternative embodiment a bayonet-type locking knob is attached to the head of the clamping shaft and the wedging assembly is mounted on a permanent bridge.

The apparatus herein described is lightweight, simple in design, provides concentric and firm clamping of a flexible disk to the hub of a disk drive and prevents misregistration of the disk to the hub. Because of the simple design a substantial savings in manufacturing cost is realized. Additionally, the flexible disks used in this apparatus have experienced less wear and tear thus prolonging their magnetic reliability and life.

From the above it will be seen that there has been provided a novel disk clamping and centering apparatus which fulfills all of the objects and advantages set forth above.

While there has been described what is presently considered to be the preferred embodiment of the invention, it will be understood that various modifications may be made therein, and it is intended to cover in the appended claims all such modifications as fall within the true spirit and scope of the invention.

What is claimed is:

1. In a disk drive, an apparatus for clamping and centering a flexible magnetic disk, said apparatus comprising:

a hub including an inner wall defining a recess therein and a face portion for supporting the associated flexible disk;

expandable means for expanding against said inner wall of said hub and for clamping the disk to said face portion of said hub; and means for wedging said expandable means into its expanded position;

whereby said expandable means locates the disk against the inner wall of said hub, thus centering the disk on the hub, and clamps the disk to said face portion of said hub.

2. The apparatus set forth in claim 1 wherein said expandable means is a flexible collet.

3. The apparatus set forth in claim 2 wherein said collet and said wedging means are coaxial.

4. The apparatus set forth in claim 3 and further comprising a shaft and actuating spring means;

said collet and said wedging means being disposed on said shaft, and said spring means forcing said wedging means against said expandable collet.

5. The apparatus set forth in claim 4, said disk drive further including a movable cover portion, said shaft being associated with said cover, such that closing said cover portion moves said collet into said recess in said hub and forces said spring means against said wedging means, said wedging means radially expanding said collet, thus centering and clamping the disk.

6. The apparatus set forth in claim 5, wherein the axis of said shaft is radially displaceable with said cover.

7. The apparatus set forth in claim 1 wherein said expandable means includes a lip portion for clamping the associated disks to said face portion of said hub.

8. The apparatus set forth in claim 1 wherein said inner walls have a circular periphery and said disk includes a central opening that is of smaller diameter than the internal diameter of said inner walls, whereby said expandable means stretches said disk while clamping, thereby concentrically centering said disk on said hub.

9. The apparatus set forth in claim 1, and further comprising a release spring disposed between said expandable means and said wedging means, said release spring enabling said expandable means to be seated with respect to said face portion of said hub before said wedging means expands said expandable means.

10. The apparatus set forth in claim 1, wherein said expandable means has a tapered lead surface to locate the disk thereon.

* * * * *